(12) United States Patent
Goetz

(10) Patent No.: US 8,796,969 B2
(45) Date of Patent: Aug. 5, 2014

(54) SWITCH ARRAY FOR USE IN MOTOR CONTROL

(75) Inventor: Jay Goetz, Deephaven, MN (US)

(73) Assignee: International Rectifier Corporation, El Segundo, CA (US)

( * ) Notice: Subject to any disclaimer, the term of this patent is extended or adjusted under 35 U.S.C. 154(b) by 0 days.

(21) Appl. No.: 11/627,286

(22) Filed: Jan. 25, 2007

(65) Prior Publication Data

US 2007/0170884 A1 Jul. 26, 2007

Related U.S. Application Data

(60) Provisional application No. 60/761,827, filed on Jan. 25, 2006, provisional application No. 60/762,014, filed on Jan. 25, 2006.

(51) Int. Cl.
*H02P 6/14* (2006.01)

(52) U.S. Cl.
USPC ............ 318/400.26; 318/400.23; 318/400.24; 318/400.28; 318/400.29; 318/801; 318/800

(58) Field of Classification Search
USPC ......... 318/799, 772, 634, 432, 254, 700, 801, 318/299, 515, 516, 528, 599, 400.01, 318/400.26, 400.27, 400.29, 800, 400.23, 318/400.24, 400.28; 363/41, 21.18, 135, 363/147, 150, 59, 175; 323/256; 314/72; 388/856, 907.2; 361/679.42
See application file for complete search history.

(56) References Cited

U.S. PATENT DOCUMENTS

| | | | | | |
|---|---|---|---|---|---|
| 4,233,548 | A | * | 11/1980 | Kirtley, Jr. | 318/400.01 |
| 4,264,846 | A | * | 4/1981 | Sauer et al. | 318/249 |
| 4,449,079 | A | * | 5/1984 | Erdman | 318/400.31 |
| 4,642,751 | A | * | 2/1987 | Schauder | 363/159 |
| 4,685,049 | A | * | 8/1987 | Neft | 363/159 |
| 4,961,038 | A | * | 10/1990 | MacMinn | 318/696 |
| 5,218,283 | A | * | 6/1993 | Wills et al. | 318/748 |
| RE34,399 | E | * | 10/1993 | Gami et al. | 360/73.01 |
| 5,463,299 | A | * | 10/1995 | Futami et al. | 318/618 |
| 5,610,806 | A | * | 3/1997 | Blasko et al. | 363/41 |
| 5,825,145 | A | * | 10/1998 | Pham et al. | 318/400.01 |
| 5,912,813 | A | * | 6/1999 | Kerkman et al. | 363/98 |
| 5,917,721 | A | * | 6/1999 | Kerkman et al. | 363/98 |
| 5,932,942 | A | * | 8/1999 | Patyk et al. | 310/58 |
| 6,142,760 | A | * | 11/2000 | Niizeki et al. | 425/145 |
| 6,449,181 | B1 | * | 9/2002 | Rieger et al. | 363/159 |
| 6,462,974 | B1 | * | 10/2002 | Jadric | 363/127 |
| 6,512,341 | B2 | * | 1/2003 | Matsushiro et al. | 318/400.07 |
| 6,650,081 | B2 | * | 11/2003 | Iwaji et al. | 318/700 |
| 6,674,628 | B1 | * | 1/2004 | Wohlfarth | 361/153 |
| 6,847,531 | B2 | * | 1/2005 | Bixel | 363/71 |

(Continued)

FOREIGN PATENT DOCUMENTS

JP 57043574 * 3/1982 ............ H02M 7/515

*Primary Examiner* — Antony M Paul
(74) *Attorney, Agent, or Firm* — Farjami & Farjami LLP

(57) ABSTRACT

An switch array for use in a motor control circuit with a power source, controller and a motor includes a plurality of bidirectional switches positioned between the power source and the motor, wherein the bidirectional switches are PWM controlled by high speed control signals from the controller to provide power from the power source to the motor as desired, wherein the switch array is positioned substantially adjacent to the motor. The power source may be a three phase AC power source. The switches are preferably bidirectional gallium nitride (GaN) switches.

22 Claims, 14 Drawing Sheets

(56) References Cited

U.S. PATENT DOCUMENTS

| | | | |
|---|---|---|---|
| 6,894,455 B2* | 5/2005 | Cai et al. | 318/771 |
| 6,906,499 B2* | 6/2005 | Hussein et al. | 323/222 |
| 6,982,534 B2* | 1/2006 | Hahn et al. | 318/400.03 |
| 6,995,481 B2* | 2/2006 | Gibson | 307/96 |
| 7,042,182 B2* | 5/2006 | Hahn et al. | 318/400.3 |
| 7,082,020 B2* | 7/2006 | Friedrichs et al. | 361/93.9 |
| 7,154,237 B2* | 12/2006 | Welchko et al. | 318/400.27 |
| 7,161,318 B2* | 1/2007 | Hauselt et al. | 318/400.08 |
| 7,199,535 B2* | 4/2007 | Welchko et al. | 318/105 |
| 7,256,564 B2* | 8/2007 | MacKay | 318/400.34 |
| 7,298,123 B2* | 11/2007 | Watanabe et al. | 323/282 |
| 7,821,220 B2* | 10/2010 | El-Ibiary | 318/600 |
| 2006/0055352 A1* | 3/2006 | Mori et al. | 318/432 |

* cited by examiner

Measured Current at Both Ends (250ft)
1HP/460V

Measured Voltage at Both Ends (250ft)

SWITCH ARRAY FOR USE IN MOTOR CONTROL

CROSS-REFERENCE TO RELATED APPLICATION

The present application claims benefit of and priority to Provisional Patent Application Ser. No. 60/761,827 entitled 2-LINE FED GAN INVERTER FOR REMOTE LOCATIONS filed Jan. 25, 2006, the entire contents of which are hereby incorporated by reference herein.

The present application claims benefit of and priority to Provisional Patent Application Ser. No. 60/762,014 entitled 3-PHASE (DC-LINKLESS) FED GAN INVERTER FOR REMOTE LOCATIONS filed Jan. 25, 2006, the entire contents of which are hereby incorporated by reference herein.

BACKGROUND OF THE INVENTION

In certain environments, such as factories, for example, multiple motors may be used in different locations throughout the area. It is generally preferable, however, to provide a central location to provide control for all of the motors. In this situation, since the motors may be spaced widely from each other and from the central location, the distance between the central location and each individual motor may be relatively long. As is described is further detail below, the high speed switching that is commonly used to provide the signals to control the motors causes substantial noise when it is transmitted over lines that are relatively long. This noise interferes with the operation of the motors and is thus undesirable.

FIG. 1 illustrates one example of a conventional approach to motor control is such an environment. Generally, DC-Link fed motor drives use a converter-inverter approach with intermediate link control to control the speed and torque of motors used for applications like fans, blowers pumps and compressors, for example. As illustrated in FIG. 1, an AC input voltage, preferably a line voltage, may be supplied to an input rectifier 12 which rectifies the AC voltage to provide a DC voltage across DC bus voltage capacitor 13. This voltage is provided to motor 14 via the output inverter 15. A bias power supply 16 is provided to power a control and pulse width modulation (PWM) component 17 which provides PWM control for the switches S1-S6 of the output inverter 15 via the gate driver 18. That is, the switches S1-S6 are controlled such that the output voltage signal provided from the inverter 15 to the motor 14 results in the desired operation of the motor. An EMI filter 11 may also be provided to filter the line voltage.

The conventional approach to motor control described above is effective, however, as noted above, this approach results in the introduction of substantial noise. Since the motor 14 may be separated from the central control location, the voltage signal provided to the motor 14 must travel a relatively long distance. The high speed, high voltage switching that is used to provide the voltage signal supplied to the motor 14 results in substantial noise. The noise is fed back to the motor 14 and interferes with its operation. That is, reflection and distortion of current and voltage waveforms occurs, which in turn interferes with proper control of the motor 14. FIGS. 2 and 3 are graphs that illustrate the effect of noise on current and voltage waveforms. FIG. 2 illustrates the measured current waveform at either end of the line connecting the inverter 15 and the motor 14. As can be seen in FIG. 2, the current waveform shows substantial disturbance. FIG. 3 illustrates the effect of noise on measured voltage waveform at each end of the line connecting the inverter 15 and the motor 14.

Thus, it would be desirable to provide for centralized motor control while avoiding the problems mentioned above.

SUMMARY OF THE INVENTION

It is an object of the present invention to provide a switch array for use in a control circuit for a motor that avoids the problems noted above.

A switch array for use in a motor control circuit with a power source, controller and a motor in accordance with an embodiment of the present invention includes a plurality of bidirectional switches positioned between the power source and the motor, wherein the bidirectional switches are PWM controlled by a high speed control signal from the controller to provide power from the power source to the motor as desired, wherein the switch array is incorporated into the motor.

A switch array for use in a motor control circuit including a three phase AC power source, a controller and a motor in accordance with an embodiment of the present invention includes a plurality of bidirectional switches positioned between the three phase AC power source and the motor, wherein the bidirectional switches are PWM controlled by a high speed control signal from the controller to provide power from the three phase AC power source to the motor as desired, wherein the switch array is incorporated into the motor.

Other features and advantages of the present invention will become apparent from the following description of the invention which refers to the accompanying drawings.

BRIEF DESCRIPTION OF THE DRAWING(S)

DETAILED DESCRIPTION OF PREFERRED EMBODIMENTS OF THE INVENTION

Figure 1:
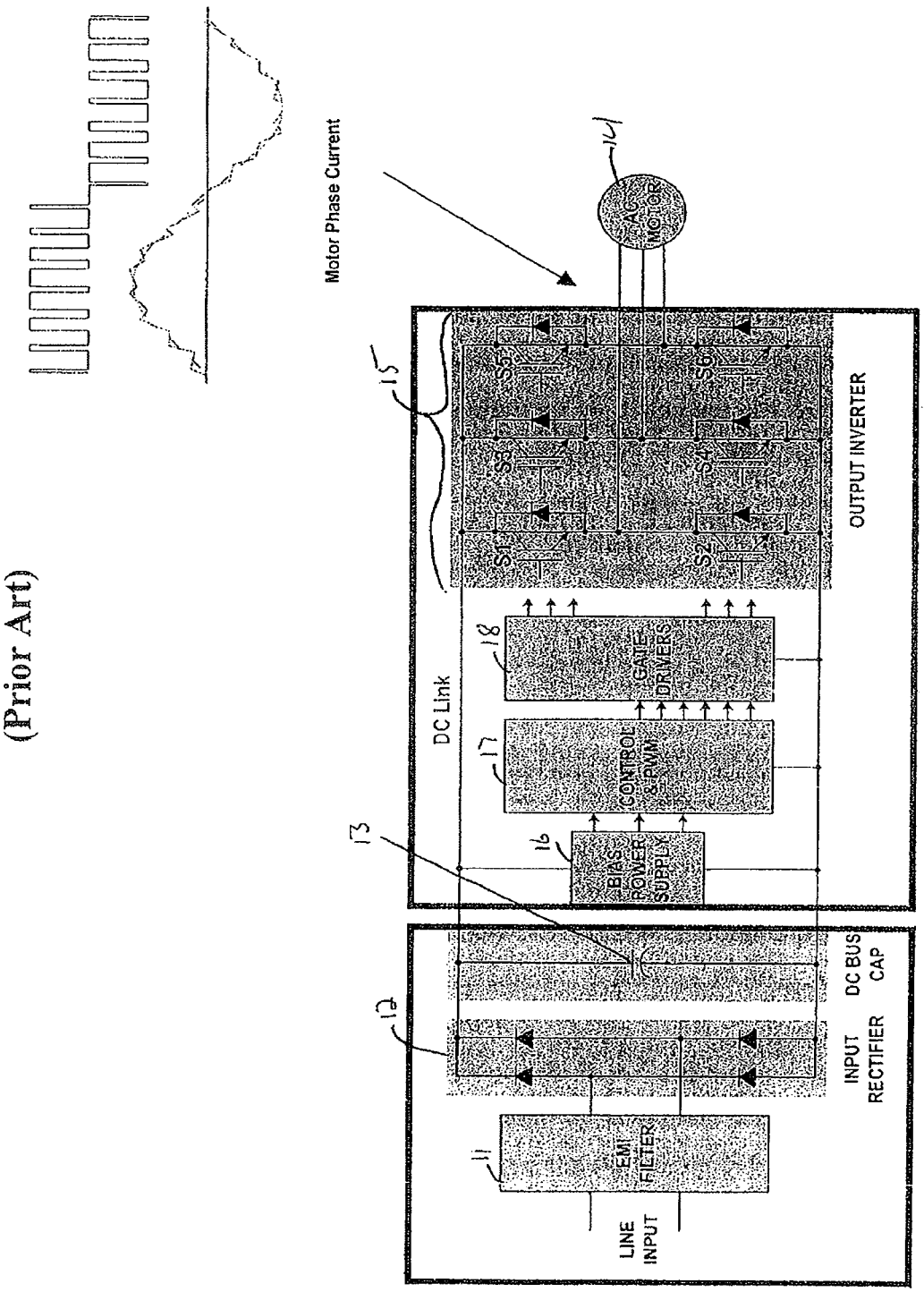
FIG. 1 is an illustration of a convention motor control circuit.
Figure 2:
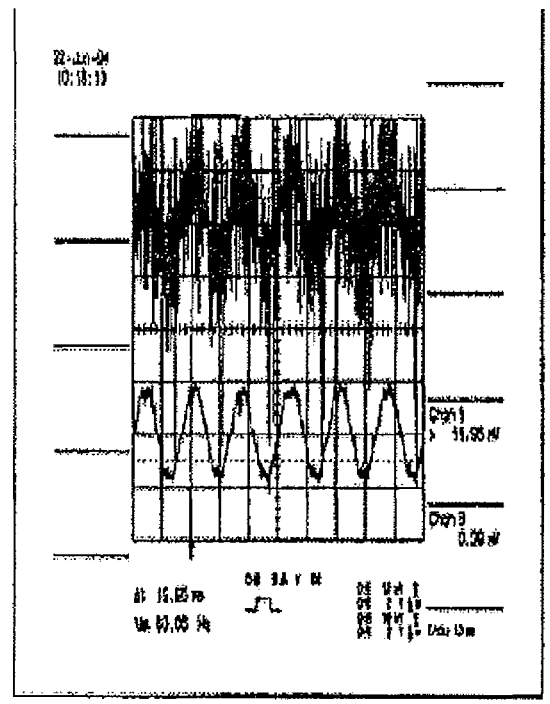
FIG. 2 is an illustration of the effect of noise on a current waveform of the circuit in FIG. 1.
Figure 3:
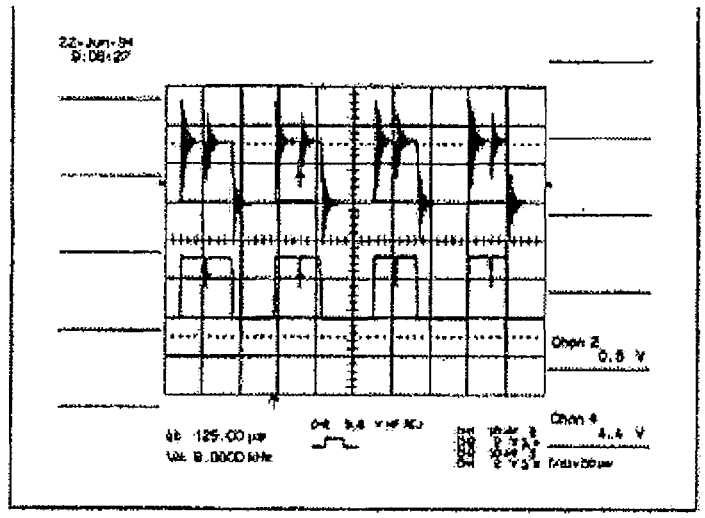
FIG. 3, is an illustration of the effect of noise on the voltage waveform of the circuit of FIG. 1.
Figure 4:
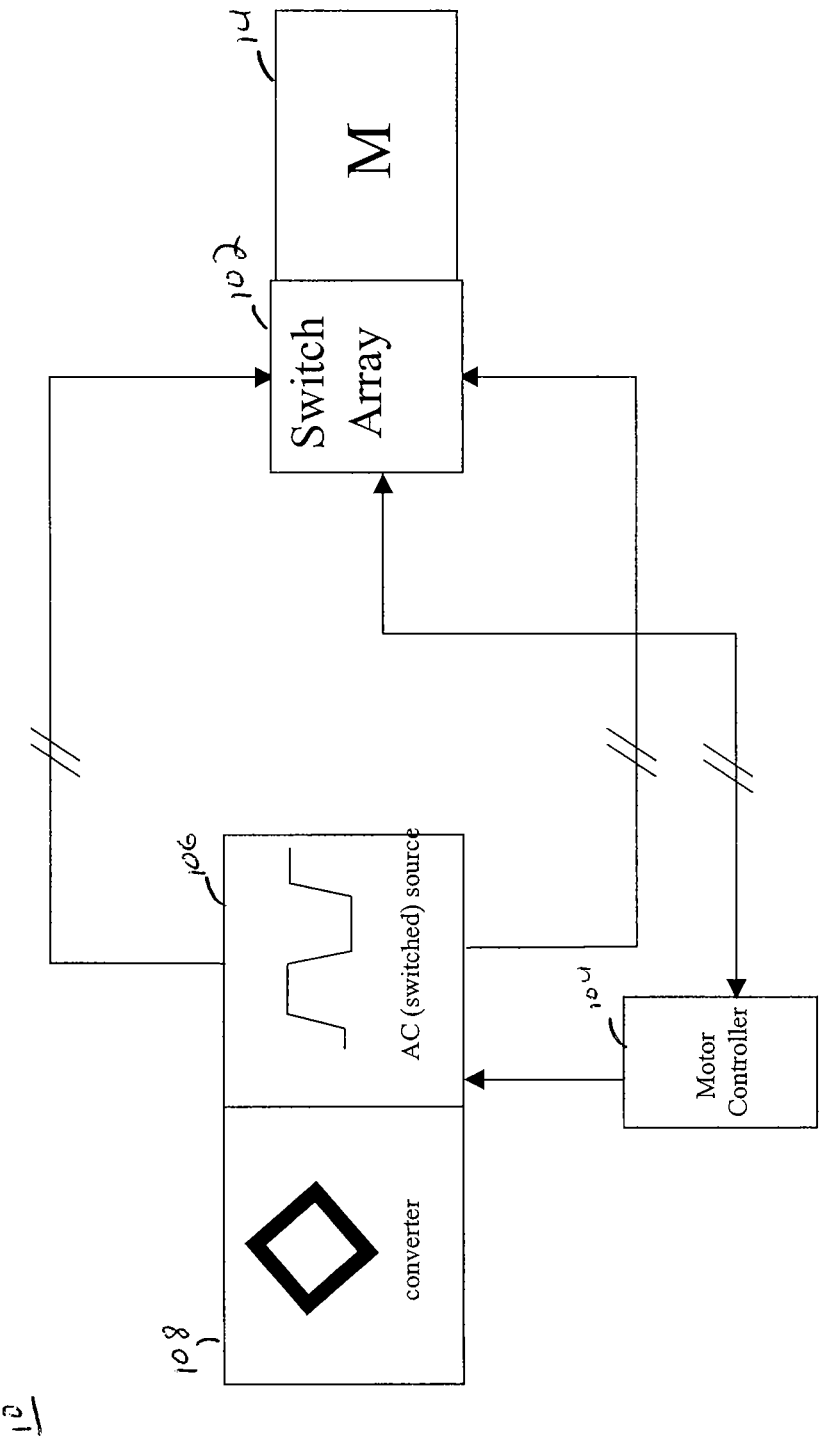
FIG. 4 is an illustration of a switch array for use in a motor control circuit in accordance with an embodiment of the present invention.

A switch array 102 for use in a control circuit 10 for a motor 14 in accordance with an embodiment of the present invention is illustrated generally in FIG. 4. The switch array 102 is preferably incorporated directly with the motor 14. However, the switch array 102 may be positioned immediately adjacent to the motor 14 such that there is a relatively small distance between the switch array 102 and the motor 104. In a preferred embodiment, the switch array 102 includes a plurality of bidirectional gallium nitride (GaN) switches. Bidirectional GaN switches are well know in the art and thus need are not be discussed herein in further detail. One non-limiting example of such a bidirectional GaN switch is described in U.S. Patent Publication No. 2005/0189561 entitled III-NITRIDE BIDIRECTIONAL SWITCH, filed on Feb. 11, 2005 the entire contents of which are hereby incorporated by reference herein. U.S. Patent Publication No. 2005/0189561 is assigned to International Rectifier Corporation, who is also the assignee of the present application. While bidirectional GaN switches are specifically disclosed, any bidirectional switches may be used in the switch array 102, for example, bidirectional IGBT's. A controller 104 is preferably provided to control the power source 106 and the switch array 102. The power source 106 preferably provides a switched voltage signal to the switch array 102 which is then provided to the motor 14 to provide the desired torque. The power source 106 is preferably connected to converter 108, which may be the rectifier 12, for example, described above with reference to FIG. 1, or any other suitable device.

Figure 5:
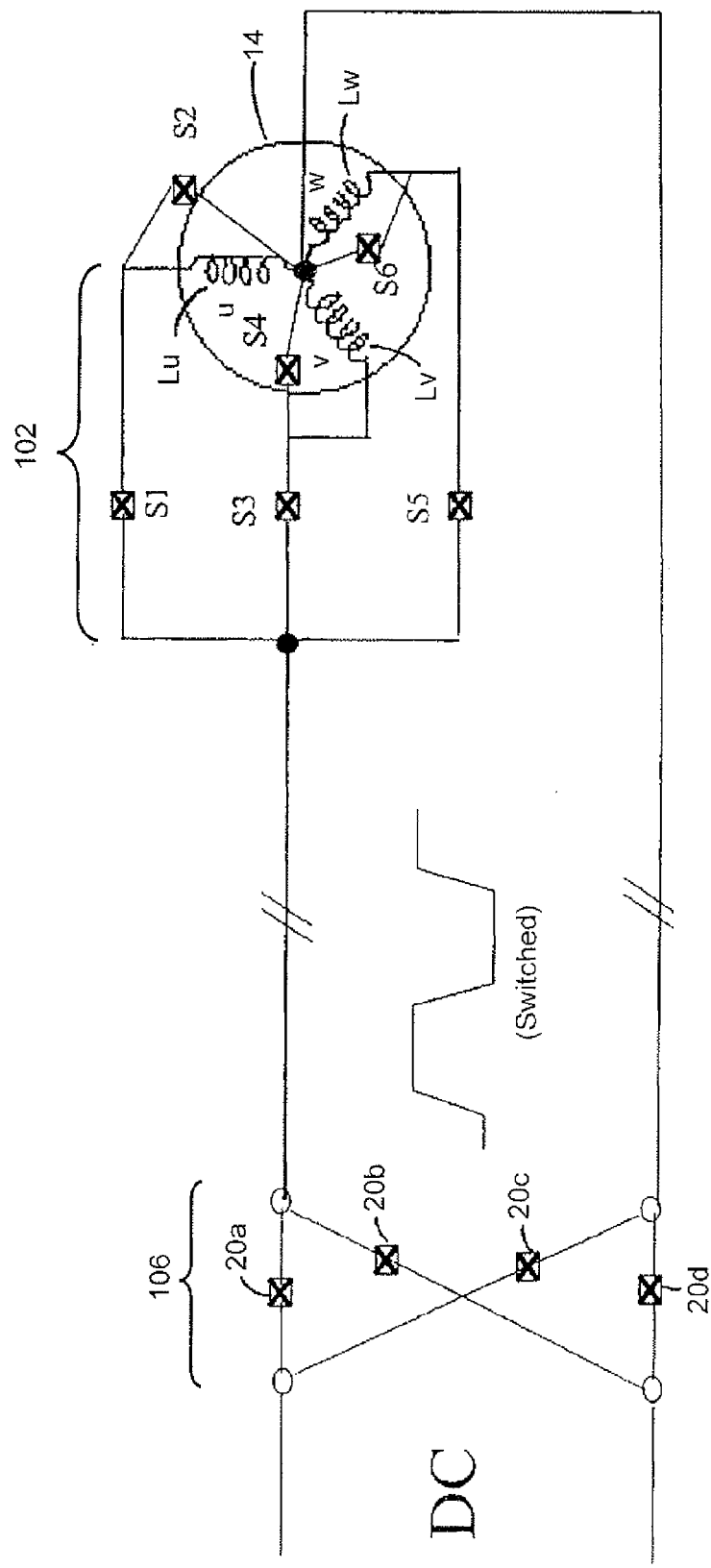
FIG. 5 is a more detailed illustration of the switch array and power source of FIG. 4.

A more detailed illustration of the switch array 102 and the power source 106 of FIG. 4 is illustrated in FIG. 5. Low speed switches 20a, 20b, 20c and 20d are preferably provided in the power source 106 to convert an input voltage into the switched voltage signal (or current) provided to the switch array 102. The input voltage may be the DC voltage provided across the capacitor 13 from the rectifier 12 of FIG. 1, for example. However, any appropriate power source may be used. Since the switches 20a, 20b, 20c and 20d are switched at a relatively low speed, minimal noise is introduced by the source 106 despite the relatively long distance between the switches 20a-20d and the switch array 102 and the motor 14. Alternatively, a single phase of a three phase AC power source, for example, may be used as the power source 106. In this case, the switches 20a-20d would not be necessary.

The motor 14 includes a rotor with three legs, u, v, w, each of which includes a coil, or winding, Lu, Lv, Lw. The legs are preferably offset from each other by 120 degrees. That is, when the motor 14 is a three phase motor, the legs u, v, w are preferably offset from each other by 120 degrees. More accurately, the windings are offset from each other magnetically by 120 degrees, which may be accomplished by physically offsetting the legs u, w, v by 120 degrees. However, the switch array of the present invention is not limited for use with three phase motors and could be used with any multiple phase motor. While the motor 14 in FIGS. 4-5, for example, are described in the context of a two pole motor, the switch array 102 of the present invention may be used with motors having any number of poles. The switch array 102 includes 6 high speed switches S1', S2', S3' . . . S6'. The input switches S1', S3', S5' are positioned between the source 106 and the legs u, v and w, respectively. Switch S2' is positioned across the winding Lu, switch S4' is positioned across winding Lv and switch S6' is positioned across winding Lw. Collectively, the switches S2', S4' and S6' may be referred to as recirculation switches. As is noted above, the switches S1'-S6' of switch array 102 are preferably bidirectional high speed, high temperature GaN switches. The switches 20a-20d may also be bidirectional GaN switches. These switches are switched at a frequency that is much higher than the rotation rate of the motor 14 to ensure that smooth torque is available for each rotation of the motor 14 at any speed. The switches 20a-20d are, however, switched at a frequency that is substantially less than the PWM frequency that controls the motor 14. Thus, there is little noise coming from the source 106 to the switch array 102 and motor 14 despite the relatively long length of the line connecting them.

The switches S1'-S6' of switch array 102 at the motor 14 are preferably PWM controlled to provide the appropriate magnitude and phase of voltage to each of the legs u, v, w of the motor 14. Specifically, the switches S1'-S6' are controlled in order to ensure that the proper torque is developed in the motor 14 when running at the desired speed. However, the signal provided to the motor 14 from the switches S1'-S6' travels over a very short distance as can be seen, for example, in FIG. 5. As a result, little noise is introduced to the motor 14.

Figure 6:
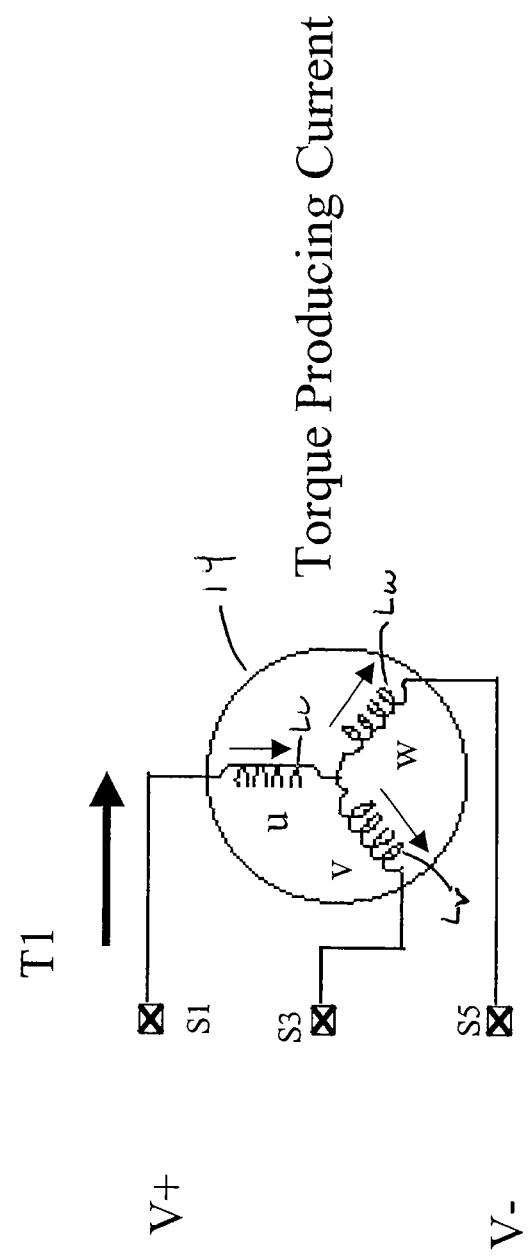
FIG. 6 illustrates the desired current directions in the motor of FIG. 5 to produce a desired torque.
Figure 7:
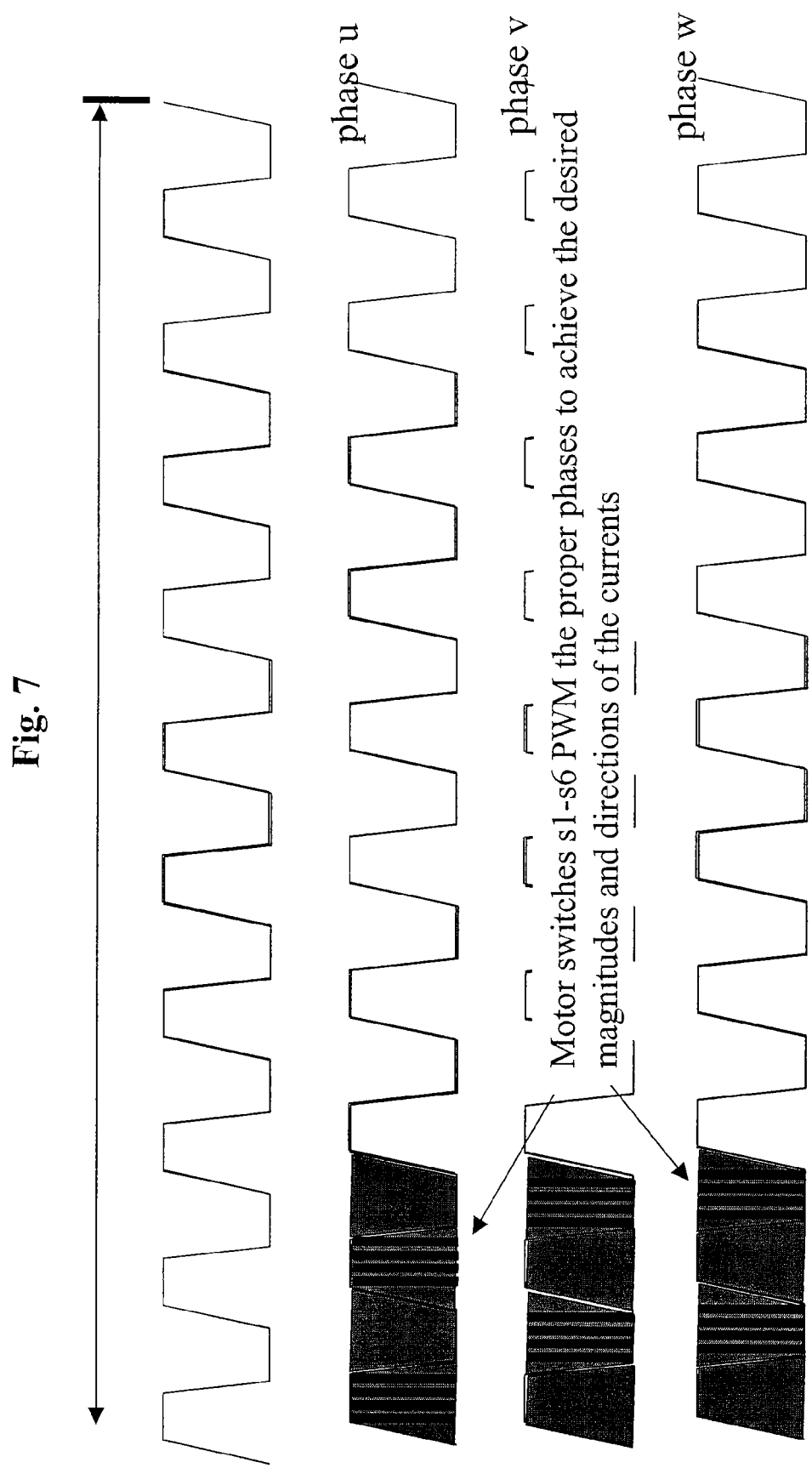
FIG. 7 is an illustration of the waveforms in each of the legs of the motor of FIG. 6.

In operation, in order to provide a desired torque T1 to act on the rotor of the motor 14, current should flow in the coils Lu, Lw, Lv of legs u, w and v of the motor 14 in the directions indicated in FIG. 6. This may be accomplished by switching at least one of the switches S1', S3' and S5' ON and switches S2', S4' and S6' OFF. More specifically, the legs u, w, v are source connected for pulse width modulation control when one of the switches S1', S3' and S5' are ON as indicated in black in FIG. 7. The currents recirculate when one of the recirculation switches S2', S4' and S6' are ON. This is shown in the shaded portion of FIG. 7. While not specifically illustrated, the recirculation switches S2', S4' and S6' may also be pulse width modulated controlled, if desired. It is noted that when the power source 106, for example, is switched at a frequency of 1000 Hz and the maximum rpm of the motor 14 is 5000 rpm, there are about 10 cycles of input voltage for one complete revolution of the motor 14. This provides sufficiently smooth torque production, even at the fastest rotation of the motor. That is, it is preferred that the that the ratio of the source frequency to the maximum rpm of the motor is high. One non-limiting example of where this drive topology would be useful is in a design considered for use in the International Space Station which used an a AC source frequency of 20 Khz. Another example is the use of this topology is in an aircraft which typically distribute power at a frequency of several hundred Hz. The use of the bidirectional switch array 102 allows for a reduction of components and thus saves valuable space.

Figure 8:
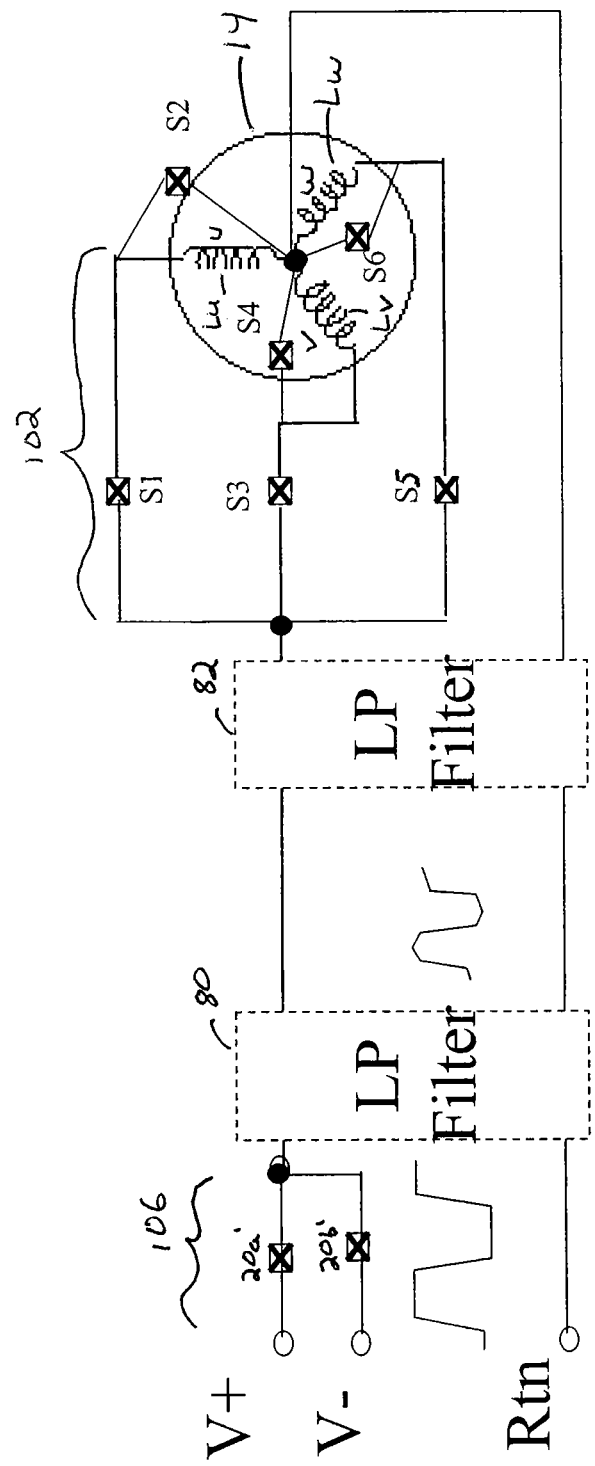
FIG. 8 is an illustration of a switch array for use in a motor control circuit in accordance with another embodiment of the present invention.

FIG. 8 illustrates an alternative embodiment of a control circuit in which the switch array 102 may be used. In FIG. 8, only two low speed switches 20a', 20b' are provided at the source 106. In this case, the peak to peak source voltage provided by the source 106 is ½ that provided in the embodiment of FIG. 6. The switches S1" to S6" work in substantially the same fashion as the switches S1'-S6' described above. One advantage of using 4 low speed switches, as illustrated in FIG. 6, is that peak to peak source voltage is applied differentially, thus 270 V DC, for example, looks like 540 VDC from the point of view of the motor 14. As illustrated in FIG. 8, a low pass filter 80 may also be provided between the switches 20a' and 20b' and the switches S1" to S6" on the source side in order to reduce "edge" switching noise and further reduce EMI. In addition, another low pass filter 82 may be provided on the switch array side as well to provide smoothing and filtering of the di/dt switching noise emanating from the switch array 102. The low pass filters 80, 82 are optional and either one or the other, or both, need not be included. Otherwise, the circuit of FIG. 8 operates substantially the same way as that described in FIGS. 6-7.

Figure 9:
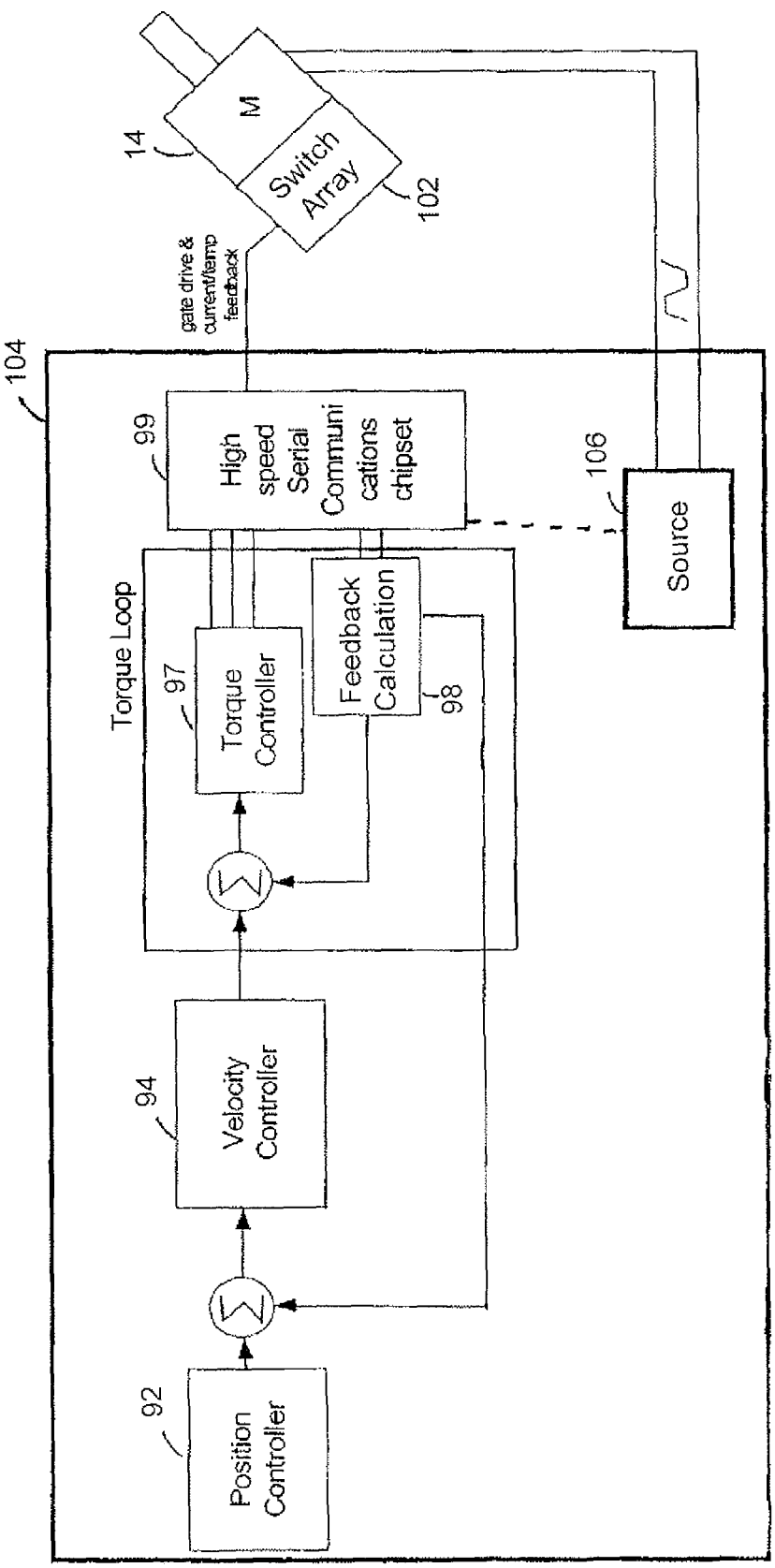
FIG. 9 is an illustration of a controller for use in the circuits of FIGS. 4, 5 and/or 8.

FIG. 9 illustrates an embodiment of a controller 104 for use with the switch array 102. Specifically, the controller 104 preferably uses field oriented control (FOC). Field orientated control is well known in the art and thus need not be discussed in detail. However, as illustrated, the controller 104 uses feedback from the motor 14 to determine position, velocity and torque information which in turn is used to control the motor. Temperature information from the motor 14 or switch array 102 may also be used. The controller 104 preferably includes a position controller 92 that is provided for determining and controlling the rotor position of the motor 14. A velocity controller 94 is provided to determine and control motor velocity. A torque loop 96 including a torque controller 97 is used to provide control signals to control the torque of the motor 14 based on the position information from the position controller 92, velocity information from the velocity controller 94 and torque information from feedback calculator 98 which also is used to receive other feedback information from the motor 14. A communication device 99 is provided to facilitate communication between the controller 104 and the motor 14. Preferably, as indicated in FIG. 9, the communication device 99 includes a high speed serial communication chipset, however, any suitable communication device may be used. Low voltage differential switching (LVDS) may be used, for example. Another possible alternative is the use of a IEEE 1394 cable. Alternatively, an FO communication bus may be used. Optical fibers may also be used to connect the controller 104 to the switch array 102. In another alternative, the connection between the controller 104 and the switch array 102 may be wireless. In any case, transport delays should be sufficiently minor to be acceptable for use with conventional closed loop control PWM rates. The high speed communication device 99 provides the control signals to the switch array 102 that are used to drive the switches S1'-S6' or S1'-S6'. In addition feedback information from the motor 14 is received from via the communication device 99. Typically, this information includes voltage and current information or temperature information from the motor 14 which can be used to determine rotor position, velocity and torque information in known ways.

As illustrated in FIG. 9, the power source, or supply, 106 that provides power to the motor 14 may be positioned in the same general area as the controller 108, as is also illustrated in FIG. 5. However, the controller 104 may be separated from the source 106, if desired. The controller 104 may also control the power source 106, for example, the low speed switches 20a-20d thereof that provide the switched voltage signal to the switch array 102 and the motor 14.

The present invention may also be applied for use in a motor that is powered by three phase AC power. For example, in aircraft design, airplane designers have increasingly tended to provide 3 phase 400-800 Hz AC power throughout the craft. Thus, vendors of motor driven accessories for the airplanes are encouraged to provide accessories that run off the 3 phase AC power supplied. However, the voltage signals sent to the motors to control them still travel a long distance and are switched at a high frequency, thus, resulting in substantial noise that disrupts motor function.

Figure 10:
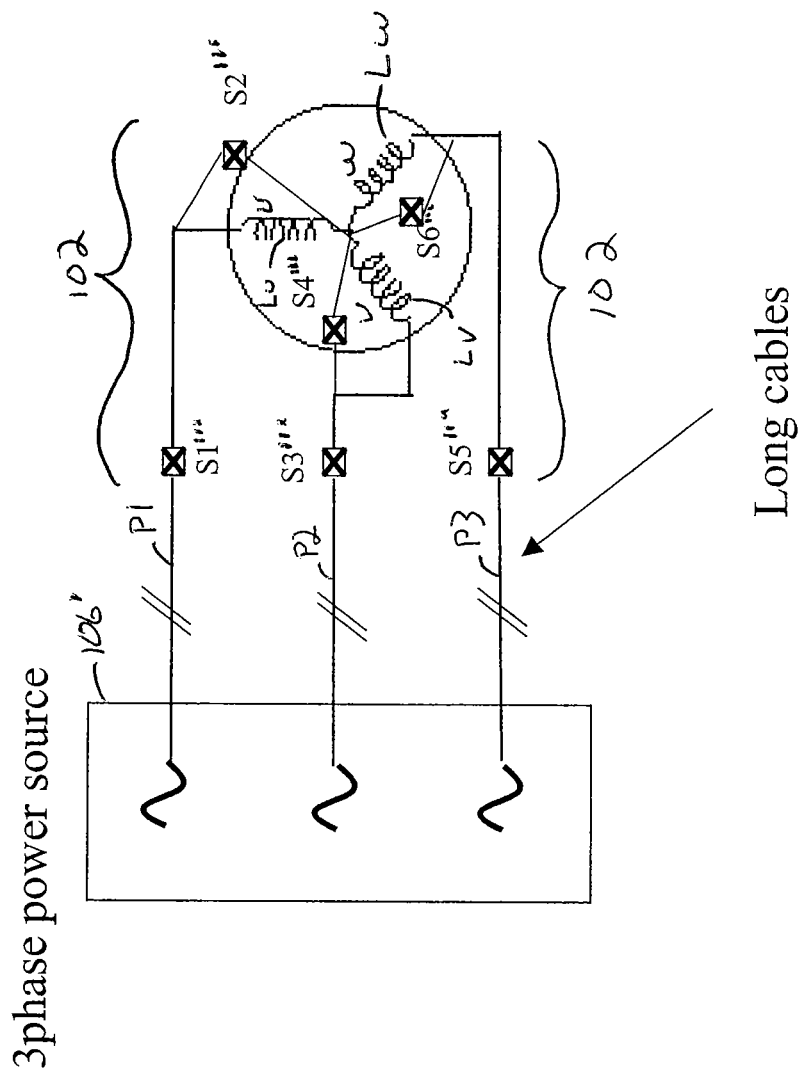
FIG. 10 is an illustration of a switch array for use in a motor control circuit in accordance with another embodiment of the present invention.

FIG. 10 illustrates another embodiment of a switch array 102 for use in a control circuit for a motor. In this embodiment, 3 phase AC power is provided to the switch array 102 via the three phase lines P1, P2 and P3. The switch array 102 is incorporated with the motor 14 in much the same manner as described above. The switch array includes 6 switches S1'''-S6'''. The switch S1''' is positioned between the first phase power line P1 and the leg u of the motor 14. The switch S3''' is connected between the second phase power line P2 and the leg v of the motor 14. The switch S5''' is connected between the third phase power line P3 and the leg w of the motor 14. Switch S2''' is positioned across the winding Lu, switch S4''' is positioned across winding Lv and switch S6''' is positioned across winding Lw in much the same manner as switches S2', S4' and S6' are positioned in FIG. 5. The switches S1'''-S6''' are also preferably bidirectional high voltage, high temperate GaN switches similar to those of FIG. 5. As is illustrated in FIG. 10, long cables are provided to connect the switch array 102 and motor 14 to the 3 phase power source 106', however, the only high speed switching that is done is done at the switches S1'''-S6''' of the switch array 102. Thus, little noise is introduced into the system.

Figure 11:
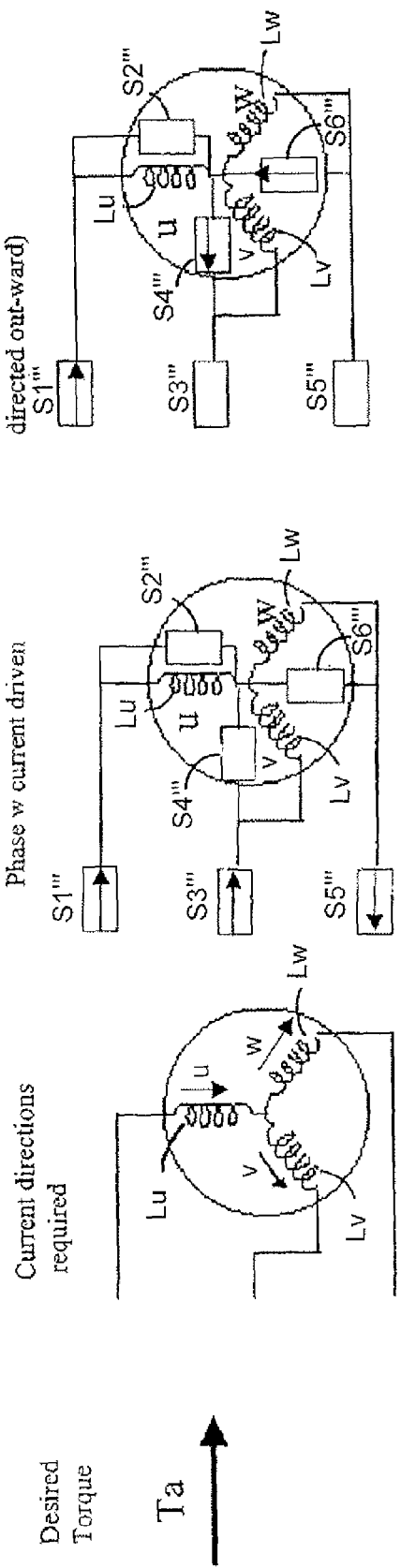
FIG. 11a illustrates the desired current directions in the motor of FIG. 10 to produce a desired torque
FIGS. 11b-c illustrate alternative switching arrangements in the switch array of FIG. 10 to provide the desired torque of FIG. 11b.
Figure 12:
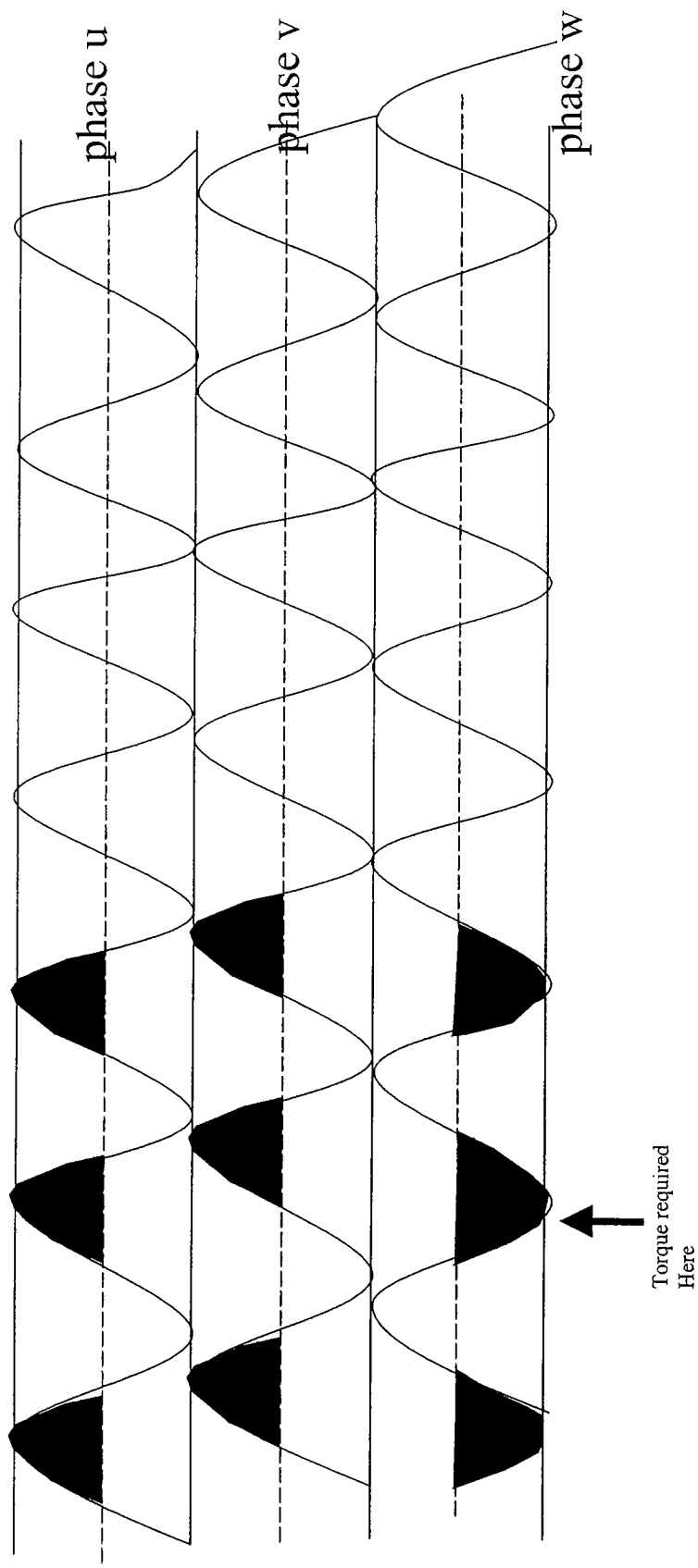
FIG. 12 is an illustration of the waveforms in each of the legs of the motor.

FIG. 11a illustrates the desired current directions in the legs u, w and v of motor 14 to provide the torque T1. FIGS. 11b and 11c illustrate two different switching arrangements that provide the desired currents to produce torques T1. FIG. 11b illustrates a first arrangement similar that described above with respect to FIGS. 5-7. That is, at least one of the input switches S1''', S3''' and S5''' are turned ON, or are pulse width modulated controlled to the source current, and the remaining switches are turned OFF. Alternatively, as illustrated in FIG. 11c, at least one of the switches S1''', S4''' and S6''' may be pulse width modulated ON and the remaining switches turned off FIG. 12 illustrates the waveforms in each of the legs u, w and v of the motor 14. The black areas of FIG. 12 indicate the time when each of the legs may be energized by the source 106'. The other areas indicate times when each phase is not energized.

Figure 13:
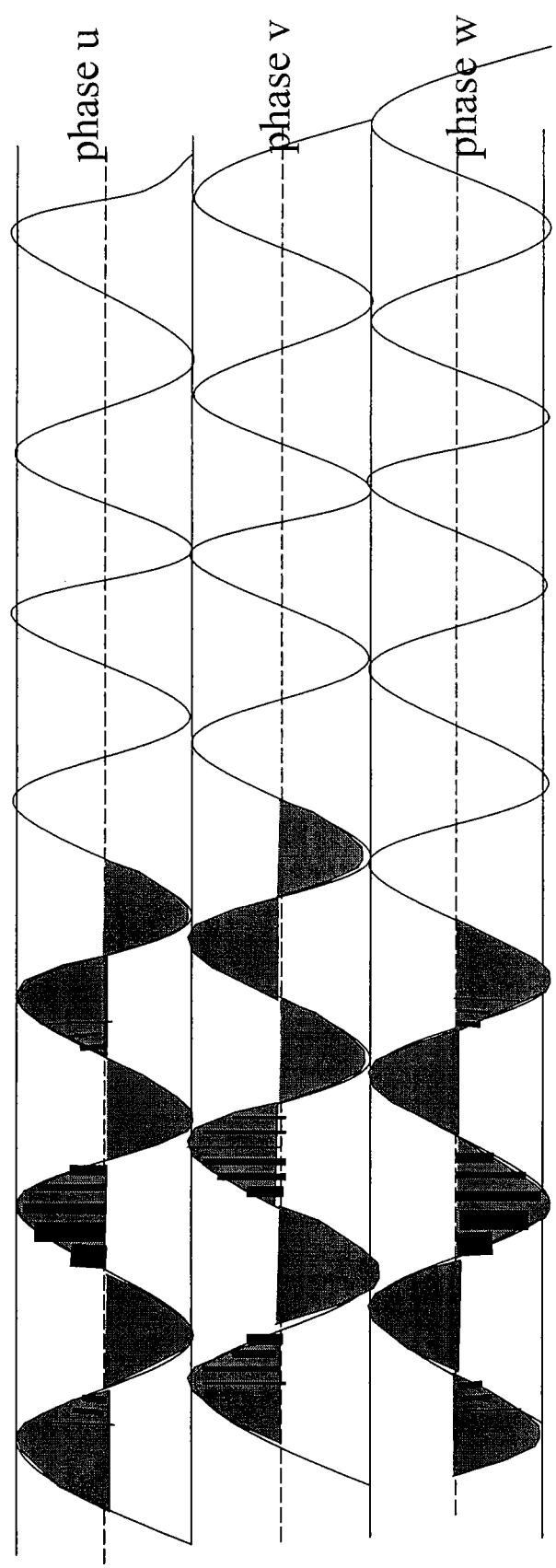
FIG. 13 is an illustration of the waveforms in each of the legs of the motor of FIGS. 11b and 11c.

FIG. 13 illustrates a PWM sequence with current driven in the legs u, v and w shown in black. Recirculation currents may be PWM controlled during the period shown as shaded as well. In this manner, torque is thus PWM modulated more precisely and delivered to the rotor in each rotation even up to 3000 RPM as there are about 8 cycles of input voltage which can be used (400 Hz source).

Figure 14:
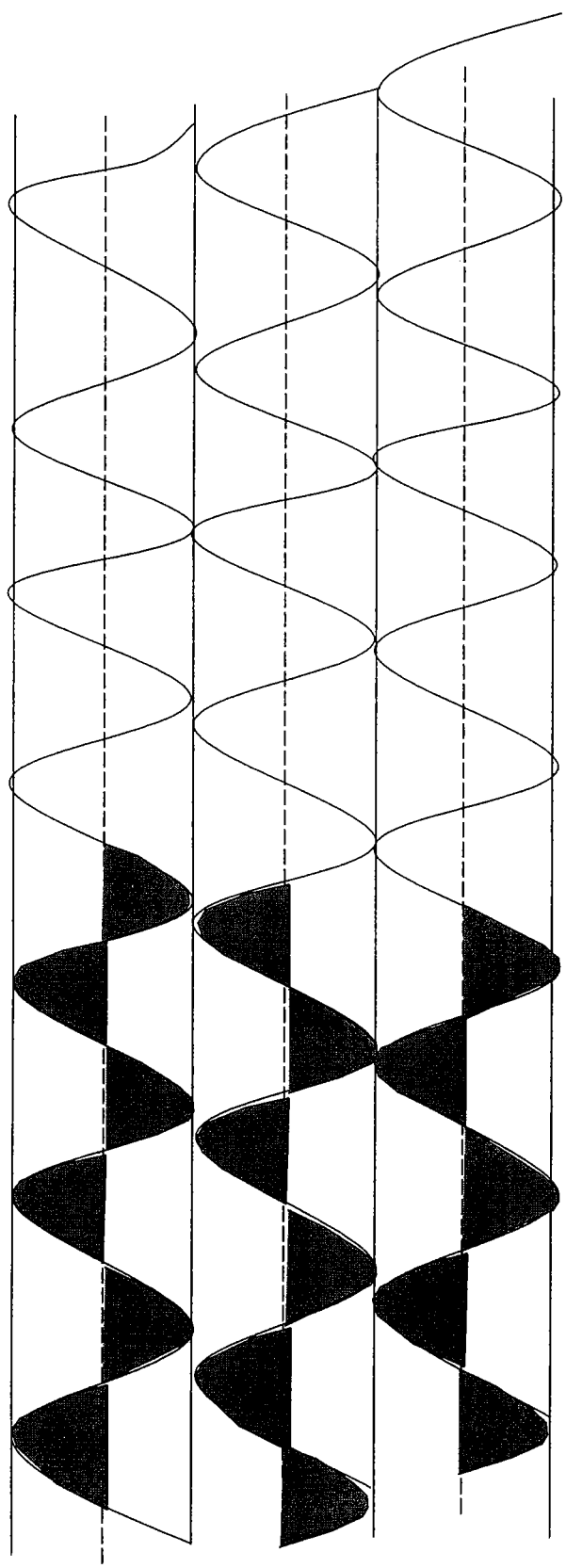
FIG. 14 is an illustration of waveforms in each of the legs of the motor in FIG. 10 when current is allowed to drain from the windings in each of the legs.

FIG. 14 illustrates the waveforms in each of the legs u, v and w when braking occurs. The source 106''' is opened and all of the recirculation switches S2''', S4''' and S6''' are closed, or modulated, which allows for rapid dissipation of current in the windings Lu, Lv, Lw.

Figure 15:
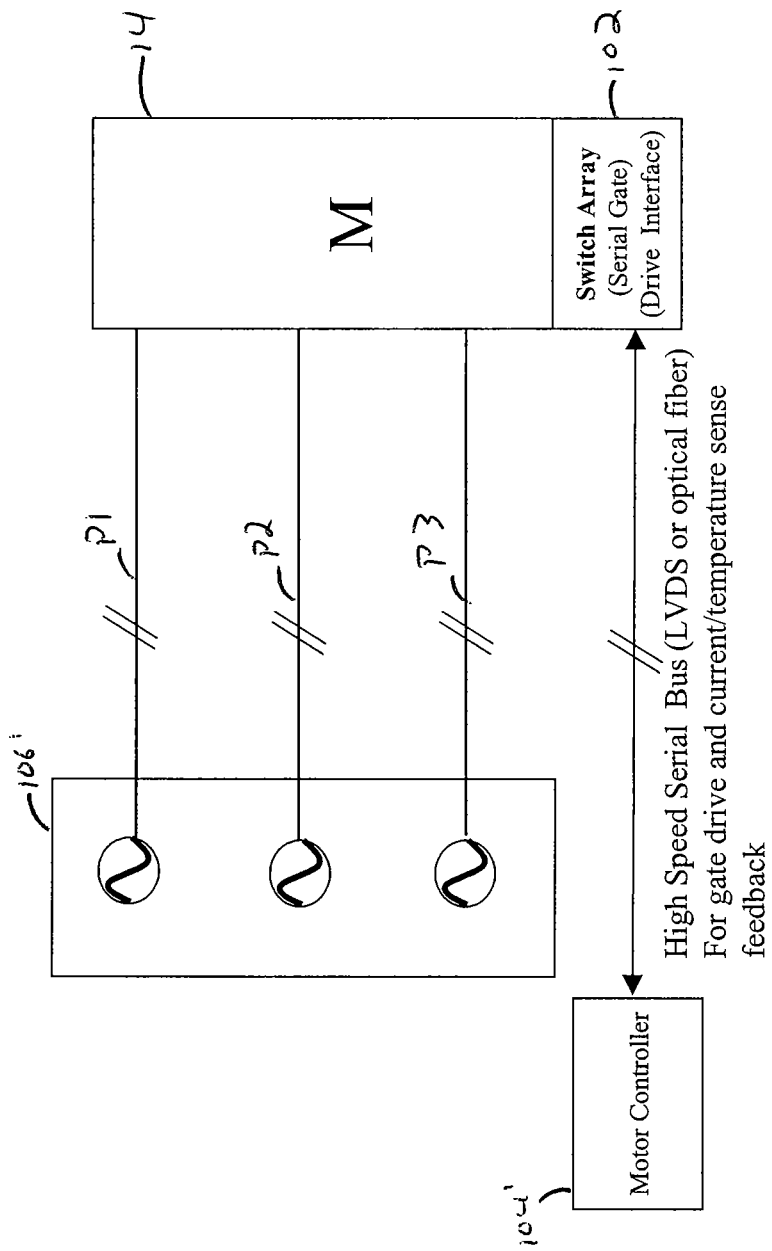
FIG. 15 is an illustration of a switch array for use in a motor control circuit in accordance with another embodiment of the present invention.

The switch array 102 of FIG. 10 may be used in conjunction with a control circuit, similar to controller 104 as is described above with respect to FIGS. 4-9. High speed communication preferably is provided between the controller and the switch array 102 to allow for PWM control of the switch array 102. FIG. 15 illustrates such an embodiment. The AC source 106' is preferably may be near the controller 104'. Alternatively, the controller 104' and the source 106' may be incorporated together. The high speed communication is provided between the controller 104' and the switch array 102 and motor 14. As illustrated, the switch array 102 may include a gate driver for the switches S1'''-S6'''.

The switch array of the present invention provides several advantages. The use of bidirectional GaN switches simplifies circuit design and allows for the use of fewer components since the switches are bidirectional. As noted above, it is not necessary to use bidirectional GaN switches, any bidirectional switch may be used. Further, pulse width modulation can be used to provide full control of the motor while minimizing noise since the high speed switching is done at the switch array 102 which is preferably incorporated into, or near, the motor 14. The wide band-gap of the GaN switches allows for higher temperature tolerance and allows for the integration of the switches into the motor 14. Further, the layout of typical GaN switches allows for additional low voltage circuits to be added to the switches to allow for gate driving and communication. However, as noted above, any bidirectional switch may be used.

Thus, in accordance with the present invention only relatively low speed switched signals are provided over the long cables to remote motors, which thus reduces EMI and switching noise on these long cables. The rise times may be shaped and filtering of high frequency switch current may also be utilized to further reduce noise. Further, closed loop control may also be provided, Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A switch array for use in a motor control circuit with a power source, controller and a motor, the switch array comprising:
   a plurality of bidirectional switches positioned between the power source and the motor, wherein the bidirectional switches are PWM controlled by high speed control signals from the controller to provide power from the power source to the motor as desired, wherein the power source is configured to provide switched signals to the plurality of bidirectional switches so as to reduce electromagnetic interference (EMI), wherein the switch array is substantially adjacent to the motor and the controller is located remotely from said switch array such that a first distance between the switch array and the motor is substantially shorter than a second distance between the controller and the switch array;
   the controller being substantially adjacent to the power source such that a third distance between the controller and the power source is substantially shorter than the second distance and a fourth distance between said power source and said switch array; and
   said controller configured to separately control said power source and said switch array.

2. The switch array of claim 1, wherein the motor further comprises:
   a first leg including a first coil;
   a second leg including a second coil; and
   a third leg including a third coil;
   wherein each leg of the first leg, second leg and third leg is positioned 120 degrees offset from the other legs.

3. The switch array of claim 2, wherein a first input switch of the plurality of bidirectional switches is positioned between the power source and the first leg of the motor;
   a second input switch of the plurality of bidirectional switches is positioned between the power source and the second leg of the motor; and
   a third input switch of the plurality of bidirectional switches is positioned between the power source and the third leg of the motor.

4. The switch array of claim 3, wherein a first recirculation switch of the plurality of bidirectional switches is positioned across the first winding;
   a second recirculation switch of the plurality of bidirectional switches is positioned across the second winding; and
   a third recirculation switch of the plurality of bidirectional switches is positioned across the third winding.

5. The switch array of claim 4, wherein first, second and third input switches and the first, second and third recirculation switches are bidirectional semiconductor switches.

6. The switch array of claim 5, wherein first, second and third input switches and the first, second and third recirculation switches are bidirectional gallium nitride (GaN) switches.

7. The switch array of claim 5, wherein the power source provides single phase AC current and voltage.

8. The switch array of claim 7, wherein the controller further comprises:
   a position controller operable to determine a position of a rotor of the motor and to provide position information;
   a velocity controller operable to determine a velocity of the motor and to provide velocity information; and
   a torque loop operable to determine the torque of the motor and to provide the high speed control signals to drive the bidirectional switches of the switch array based on the torque of the motor, the position information from the position controller and the velocity information from the velocity controller.

9. The switch array of claim 8, wherein the controller further comprises a high speed communication device operable to send the high speed control signals to the switch array and to receive feedback information regarding the motor.

10. The switch array of claim 5, wherein the power source further comprises:
    a plurality of low speed switches operable to provide low speed switching such that at least one of a switched voltage signal and a switched current signal is provided from the power source.

11. The switch array of claim 10, wherein a frequency of the switched voltage signal or the switched current signal provided by the power source is substantially higher than a maximum rotational rate of the motor.

12. The switch array of claim 11, wherein four low speed switches connected to a low pass filter provide the switched voltage signal or the switched current signal with a frequency that is sufficiently low to reduce edge switching noise in the switched voltage signal or switched current signal.

13. The switch array of claim 11, wherein two low speed switches connected to a low pass filter provide the switched voltage signal or the switched current signal with a frequency that is sufficiently low to reduce edge switching noise in the switched voltage signal or the switched current signal.

14. The switch array of claim 11, wherein the power source further comprises a low pass filter operative to reduce edge noise in the switched voltage signal or switched current signal.

15. A switch array for use in a motor control circuit including a three phase AC power source, a controller and a motor, the switch array further comprising:
    a plurality of bidirectional switches positioned between the three phase AC power source and the motor, wherein the bidirectional switches are PWM controlled by high speed control signals from the controller to provide power from the three phase AC power source to the motor as desired, wherein the three phase AC power source is configured to provide switched signals to the plurality of bidirectional switches so as to reduce electromagnetic interference (EMI), wherein the switch array is incorporated into the motor and the controller is located remotely from said switch array such that a first distance between the switch array and the motor is substantially shorter than a second distance between the controller and the switch array;

said controller being substantially adjacent to said three phase AC power source such that a third distance between said controller and said three phase AC power source is substantially shorter than said second distance and a fourth distance between said three phase AC power source and said switch array.

16. The switch array of claim 15, wherein the motor further comprises:
   a first leg including a first coil;
   a second leg including a second coil; and
   a third leg including a third coil;
   wherein each leg of the first leg, second leg and third leg is positioned 120 degrees offset from the other legs.

17. The switch array of claim 16, wherein a first input switch of the plurality of bidirectional switches is positioned between a first phase line from the three phase AC power source and the first leg of the motor;
   a second input switch of the plurality of bidirectional switches is positioned between a second phase line from the three phase AC power source and the second leg of the motor; and
   a third input switch of the plurality of bidirectional switches is positioned between a third phase line from the three phase AC power source and the third leg of the motor.

18. The switch array of claim 17, wherein a first recirculation switch of the plurality of bidirectional switches is positioned across the first winding;
   a second recirculation switch of the plurality of bidirectional switches is positioned across the second winding; and
   a third recirculation switch of the plurality of bidirectional switches is positioned across the third winding.

19. The switch array of claim 17, wherein the controller further comprises:
   a position controller operable to determine a position of a rotor of the motor and to provide position information;
   a velocity controller operable to determine a velocity of the motor and to provide velocity information; and
   a torque loop operable to determine the torque of the motor and to provide the high speed control signals to drive the bidirectional switches of the motor based on the torque of the motor, the position information from the position controller and the velocity information from the velocity controller.

20. The switch array of claim 18, wherein the first, second and third input switches and the first, second and third recirculation switches are bidirectional semiconductor switches.

21. The switch array of claim 18, wherein the controller further comprises a communication device operable to send the high speed control signals to the switch array and to receive feedback information regarding the motor.

22. The switch array of claim 20, wherein the first, second and third input switches and the first, second and third recirculation switches are gallium nitride (GaN) switches.

* * * * *